United States Patent
McConville et al.

(10) Patent No.: US 9,810,143 B2
(45) Date of Patent: Nov. 7, 2017

(54) EXHAUST CONTROL VALVE BRANCH COMMUNICATION AND WASTEGATE

(71) Applicant: Ford Global Technologies, LLC, Dearborn, MI (US)

(72) Inventors: Gregory Patrick McConville, Ann Arbor, MI (US); Daniel Joseph Styles, Canton, MI (US); Brad Alan Boyer, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 175 days.

(21) Appl. No.: 14/668,498

(22) Filed: Mar. 25, 2015

(65) Prior Publication Data
US 2016/0208680 A1    Jul. 21, 2016

Related U.S. Application Data

(60) Provisional application No. 62/104,565, filed on Jan. 16, 2015.

(51) Int. Cl.
*F02D 23/00* (2006.01)
*F02B 37/18* (2006.01)
*F02B 37/02* (2006.01)

(52) U.S. Cl.
CPC .......... *F02B 37/183* (2013.01); *F02B 37/025* (2013.01); *Y02T 10/144* (2013.01)

(58) Field of Classification Search
CPC ....... F02B 37/183; F02B 37/025; F01D 9/026
USPC ......................................................... 60/602
See application file for complete search history.

(56) References Cited

U.S. PATENT DOCUMENTS

| | | | | |
|---|---|---|---|---|
| 5,046,317 A | * | 9/1991 | Satokawa | F01D 17/105 415/151 |
| 6,269,643 B1 | * | 8/2001 | Schmidt | F02B 37/025 123/559.1 |
| 7,051,527 B2 | * | 5/2006 | Schmid | F02B 37/02 137/625.47 |
| 7,637,106 B2 | * | 12/2009 | Hertweck | F02B 37/025 137/625.47 |
| 9,359,939 B2 | * | 6/2016 | Kindl | F02B 37/001 |
| 2003/0000211 A1 | * | 1/2003 | Drangel | F01D 17/143 60/602 |
| 2010/0024414 A1 | * | 2/2010 | Hittle | F02M 26/47 60/602 |
| 2013/0014502 A1 | * | 1/2013 | Sato | F02B 37/20 60/602 |
| 2014/0219849 A1 | * | 8/2014 | Styles | F02B 33/38 418/55.1 |
| 2014/0230432 A1 | * | 8/2014 | Kindl | F02B 37/001 60/605.1 |
| 2014/0360179 A1 | * | 12/2014 | Doering | F02B 37/183 60/602 |

(Continued)

*Primary Examiner* — Ngoc T Nguyen
(74) *Attorney, Agent, or Firm* — Julia Voutyras; McCoy Russell LLP

(57) ABSTRACT

Methods and systems for adjusting a branch communication and wastegate valve in a dual scroll turbocharger system are provided. In one example, a method may include adjusting the branch communication and wastegate valve in a passage connecting a first scroll, a second scroll, and a wastegate passage may control an amount of exhaust flow to a turbine during certain engine operating conditions.

18 Claims, 6 Drawing Sheets

(56) References Cited

U.S. PATENT DOCUMENTS

| | | | |
|---|---|---|---|
| 2014/0360180 A1* | 12/2014 | Doering | F02B 37/183 60/602 |
| 2014/0360181 A1* | 12/2014 | Buckland | F02B 37/183 60/602 |
| 2014/0360182 A1* | 12/2014 | Boyer | F02B 37/183 60/602 |
| 2014/0360183 A1* | 12/2014 | Buckland | F02B 37/183 60/602 |
| 2014/0360184 A1* | 12/2014 | Buckland | F02B 37/183 60/602 |
| 2014/0360185 A1* | 12/2014 | Boyer | F02B 37/183 60/602 |
| 2015/0075159 A1* | 3/2015 | Kemmerling | F01D 17/08 60/602 |
| 2016/0138501 A1* | 5/2016 | Keating | F01D 9/026 60/605.1 |

* cited by examiner

EXHAUST CONTROL VALVE BRANCH COMMUNICATION AND WASTEGATE

CROSS REFERENCE TO RELATED APPLICATIONS

The present application claims priority to U.S. Provisional Patent Application No. 62/104,565, "EXHAUST CONTROL VALVE BRANCH COMMUNICATION AND WASTEGATE," filed on Jan. 16, 2015, the entire contents of which are hereby incorporated by reference for all purposes.

FIELD

The present disclosure relates to a turbocharger of an engine.

BACKGROUND/SUMMARY

Twin, or dual, scroll turbocharger configurations may be used in turbocharged engines. A twin scroll turbocharger configuration may separate an inlet to a turbine into two separate passages connected to exhaust manifold runners. In this way, exhaust from the engine cylinders, whose exhaust gas pulses may interfere with each other, are fluidically separated.

For example, on an I4 engine with a cylinder firing order of exhaust manifold runners 1-3-4-2, exhaust manifold runners 1 and 4 may be connected to a first inlet of a twin scroll turbine and exhaust manifold runners 2 and 3 may be connected to a second inlet of said twin scroll turbine, where the second inlet is different and fluidically separated from the first inlet. In this way, separating exhaust gas pulses may result in an increase in efficiency of exhaust gas delivery to a turbine in some cases.

However, under some engine operating conditions, separating exhaust gas pulses as described above may reduce an efficiency of exhaust gas delivery to a turbine. For example, under certain engine operating conditions, e.g., high speed and high load conditions, separating exhaust gas pulses may result in an increase in backpressure and pumping work. This increase in backpressure and pumping work may be due to more restrictive, lower volume passages between the exhaust and the turbine in a dual scroll turbine, as compared to a passage that is not separated in a single scroll turbine. As such, the amount of exhaust gas in the cylinder may raise the pressure in the lower volume passages compared to the relatively larger volume, unseparated passage. The increased backpressure may also result in higher levels of hot residual gas in the cylinder, and may reduce the engine's output power.

One example approach for reducing backpressure and pumping work in a twin scroll turbocharger has been shown by Styles et al. in US 2014/0219849. Herein, systems positioning a branch communication valve between a first scroll and a second scroll in a twin (e.g., dual) scroll turbocharger system is provided. In an example, a branch communication valve may be positioned adjacent to a dividing wall separating a first scroll and a second scroll of the twin turbocharger. In an open position, the branch communication valve may increase fluid communication between the first scroll and the second scroll, and in a closed position, the branch communication valve may decrease fluid communication between the first scroll and the second scroll. In some examples, each scroll may include a corresponding wastegate and a corresponding wastegate valve to control the amount of exhaust gas which passes through turbine.

The inventors herein have recognized a potential issue with the example approach of Styles et al. For example, there may be cost, weight, and packaging penalties associated with including both a branch communication valve and one or more wastegate valves in the turbocharger and engine system. Further, there may also be an additional burden on an engine control and monitoring system when two or more valves are implemented and adjusted by the aforementioned system based on engine operating conditions.

The inventors herein have identified an approach to at least partly address the above issue. In one example approach, a method may be provided, comprising adjusting a valve positioned in a passage connecting a first scroll and a second scroll of a turbine to increase an amount of exhaust flow to the turbine when a turbine speed is less than a threshold and during a first load condition, and adjusting the valve to decrease the amount of exhaust flow to the turbine when turbine speed is greater than the threshold, and during a second load condition. In this example, the valve is in fluid communication with a wastegate passage flowing exhaust around the turbine. In this way, an amount of fluidic communication and conveyance between the first scroll and the second scroll, and to the wastegate passage, may be adjusted to provide desired boost pressure based on various engine operating conditions.

For example, the first load condition may include one or more of boost pressure being less than a desired boost pressure, engine load being greater than a threshold load, and torque demand increasing. On the other hand, in another example, the second load condition may include one or more of boost pressure being greater than a desired boost pressure, engine load being less than a threshold load, and torque demand decreasing. By adjusting the single valve, such as a combined branch communication and wastegate valve, to control boost pressure responsive to various engine operating conditions, backpressure and pumping work may also be reduced. Further, additional burden on an engine control and monitoring system may be reduced when the single valve is implemented and adjusted as compared to implementing separate branch communication and wastegate valves.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
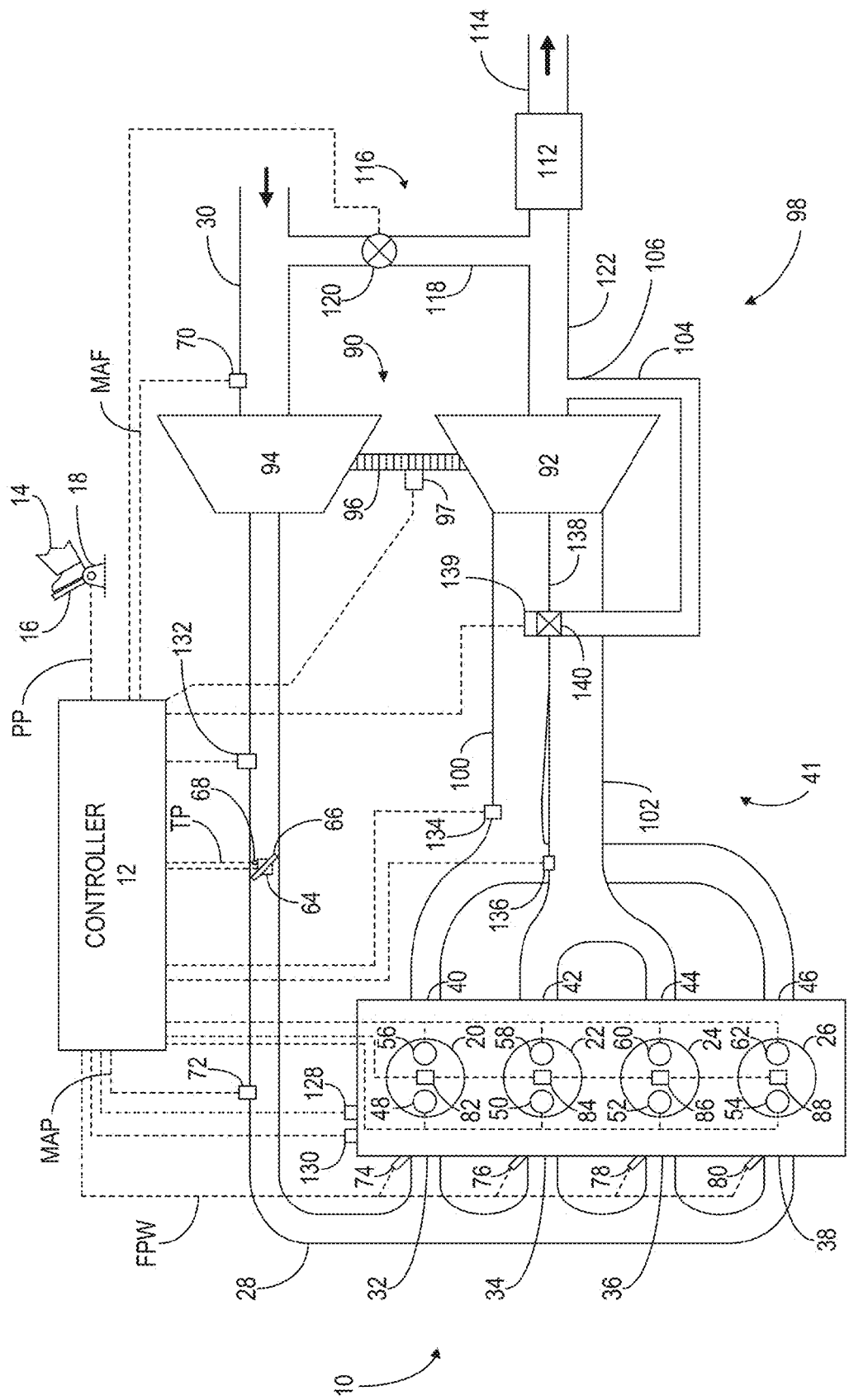
FIG. 1 shows a schematic diagram of a first example engine including a dual (twin) scroll turbocharger and a branch communication and wastegate valve.
Figure 2:
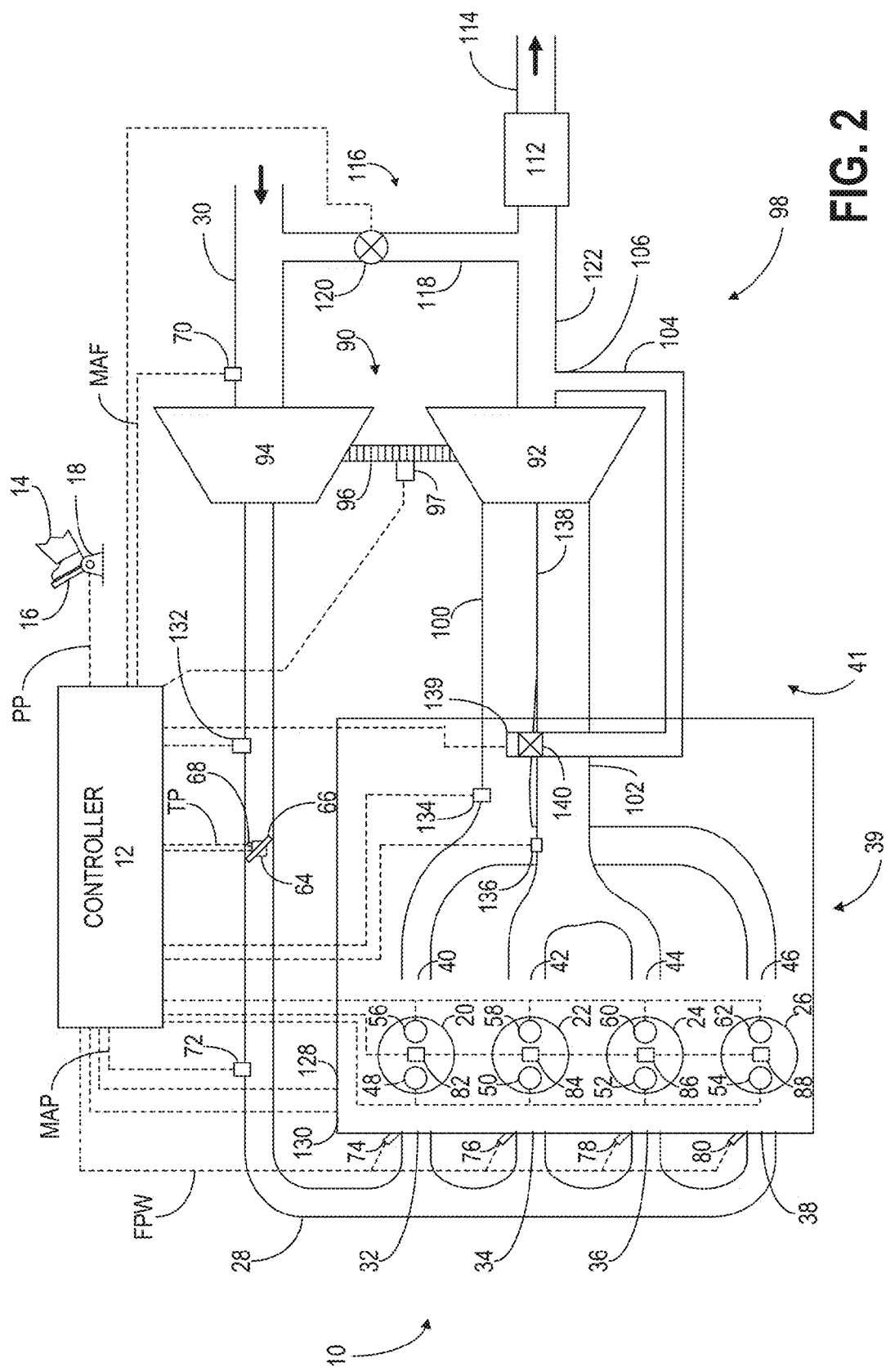
FIG. 2 shows a schematic diagram of a second example engine including a dual (twin) scroll turbocharger and a branch communication and wastegate valve.

The following description relates to systems and methods for controlling fluid communication between a first and second scroll in a dual (i.e. twin) scroll turbocharger system having a branch communication and wastegate valve in an engine system, such as the engine systems in FIGS. 1-2. As shown in FIGS. 3A-4D, in some embodiments, a combined, dual, and/or integrated functionality valve, such as a single branch communication and wastegate valve, may be provided to control an increase or decrease in fluid communication between the first and second scrolls, and exhaust gas flow through the turbine and wastegate. The combined branch communication and wastegate valve may be a cylindrical valve, as shown in FIGS. 3A-3D, or a spool valve, as shown in FIGS. 4A-4D, or any combination thereof. Opening the branch communication and wastegate valve may allow increased fluid communication between the first and second scrolls, while closing the branch communication and wastegate valve may reduce fluid communication between the first and second scrolls. Thus, an amount of fluidic communication and conveyance between the first scroll and the second scroll may be adjusted based on engine operating conditions, as shown below in reference to FIG. 5. Example valve adjustments based on engine operating conditions are shown in FIG. 6.

Turning now to FIG. 1, a schematic diagram of an engine 10, which may be included in a propulsion system of a vehicle, is shown. Engine 10 may be controlled at least partially by a control system including controller 12 and by input from a vehicle operator 14 via an input device 16. Controller 12 may be a microcomputer, including a microprocessor unit, input/output ports, an electronic storage medium for executable programs and calibration values, random access memory, keep alive memory, and a data bus. As depicted, controller 12 may receive input from a plurality of sensors (not shown), which may include user inputs and/or sensors (such as transmission gear position, gas pedal input, exhaust manifold temperature, air-fuel ratio, vehicle speed, engine speed, mass airflow through the engine, boost pressure, ambient temperature, ambient humidity, intake air temperature, cooling system sensors, and others). The controller may also send a plurality of control signals to various engine actuators (not shown) in order to adjust engine operation based on signals received from the sensors (not shown). In this example, input device 16 includes an accelerator pedal and a pedal position sensor 18 for generating a proportional pedal position signal PP. Engine 10 may be included in a vehicle such as a road vehicle, among other types of vehicles. While the example applications of engine 10 will be described with reference to a vehicle, it should be appreciated that various types of engines and vehicle propulsion systems may be used, including passenger cars, trucks, etc. Engine 10 may include a plurality of combustion chambers (i.e., cylinders). In the examples shown in FIGS. 1-2, engine 10 may include combustion chambers 20, 22, 24, and 26, arranged in an inline four configuration. It should be understood, however, that though FIG. 1 shows four cylinders, engine 10 may include any number of cylinders. For example, engine 10 may include any suitable number of cylinders, e.g., 2, 3, 4, 5, 6, 8, 10, 12, or more cylinders in any configuration, e.g., V-6, I-6, V-12, opposed 4, etc. Though not shown in FIGS. 1-2, each combustion chamber (i.e. cylinder) of engine 10 may include combustion chamber walls with a piston positioned therein. The pistons may be coupled to a crankshaft so that reciprocating motions of the pistons are translated into rotational motion of the crankshaft. The crankshaft may be coupled to at least one drive wheel of a vehicle via an intermediate transmission system, for example. Further, a starter motor may be coupled to the crankshaft via a flywheel to enable a starting operation of engine 10.

Each combustion chamber may receive intake air from an intake manifold 28 via an air intake passage 30. Intake manifold 28 may be coupled to the combustion chambers via intake ports. For example, in FIG. 1, intake manifold 28 is shown coupled to cylinders 20, 22, 24, and 26 via intake ports 32, 34, 36, and 38, respectively. Each respective intake port may supply air and/or fuel to the respective cylinder for combustion.

Each combustion chamber may exhaust combustion gases via an exhaust port coupled thereto. For example, exhaust ports 40, 42, 44 and 46, are shown in FIG. 1 coupled to cylinders 20, 22, 24, 26, respectively. Each respective exhaust port may direct exhaust combustion gases from a respective cylinder to an exhaust manifold or exhaust passage.

Each cylinder intake port can selectively communicate with the cylinder via an intake valve. For example, cylinders 20, 22, 24, and 26 are shown in FIG. 1 with intake valves 48, 50, 52, and 54, respectively. Likewise, each cylinder exhaust port can selectively communicate with the cylinder via an exhaust valve. For example, cylinders 20, 22, 24, and 26 are shown in FIG. 1 with exhaust valves 56, 58, 60, and 62, respectively. In some examples, each combustion chamber may include two or more intake valves and/or two or more exhaust valves.

Though not shown in FIGS. 1-2, in some examples, each intake and exhaust valve may be operated by an intake cam and an exhaust cam, respectively. Alternatively, one or more of the intake and exhaust valves may be operated by an electromechanically controlled valve coil and armature assembly (not shown). The position of an intake cam may be determined by an intake cam sensor (not shown). The position of exhaust cam may be determined by an exhaust cam sensor (not shown).

Intake passage 30 may include a throttle 64 having a throttle plate 66. In one example, a position of throttle plate 66 may be varied by controller 12 via a signal provided to an electric motor or actuator included with throttle 64, a configuration that is commonly referred to as electronic throttle control (ETC). In this manner, throttle 64 may be operated to vary the intake air provided to the combustion chambers. The position of throttle plate 66 may be provided to controller 12 by throttle position signal TP from a throttle position sensor 68. Intake passage 30 may include a mass air flow sensor 70 and a manifold air pressure sensor 72 for providing respective signals MAF and MAP to controller 12. MAP and MAF may not both be present, and only one sensor may be used.

In FIGS. 1-2, fuel injectors are shown coupled directly to the combustion chambers for injecting fuel directly therein in proportion to a pulse width of a signal FPW received from controller 12 via an electronic driver, for example. For example, fuel injectors 74, 76, 78, and 80 are shown in FIG. 1 coupled to cylinders 20, 22, 24, and 26, respectively. In this manner, the fuel injectors provide what is known as direct injection of fuel into the combustion chamber. Each respective fuel injector may be mounted in the side of the respective combustion chamber or on the top of the respective combustion chamber, for example. In other examples, one or more fuel injectors may be arranged in the air intake manifold 28 in a configuration that provides what is known as port injection of fuel into the intake ports (e.g., intake ports 32, 34, 36, and 38) upstream of combustion chambers. Though not shown in FIG. 1, fuel injectors may be configured to deliver fuel received via a high pressure fuel pump (not shown) and a fuel rail (not shown). Alternatively, fuel may be delivered by a single stage fuel pump at lower pressure, in which case the timing of the direct fuel injection may be more limited during the compression stroke than if a high pressure fuel system is used. Further, the fuel tank may have a pressure transducer providing a signal to controller 12. In some examples, fuel may be injected directly into each respective combustion chamber. This may be referred to as direct injection. Indirect injection may be used in other examples.

The combustion chambers of engine 10 may be operated in a compression ignition mode, with or without an ignition spark. In some examples, a distributorless ignition system (not shown) may provide an ignition sparks to spark plugs coupled to the combustion chambers in response to controller 12. For example, spark plugs 82, 84, 86, and 88 are shown in FIG. 1 coupled to cylinders 20, 22, 24, and 26, respectively.

As mentioned above, intake passage 30 may communicate with one or more cylinders of engine 10. In some embodiments, one or more of the intake passages may include a boosting device such as a turbocharger 90. Turbocharger 90 may be include a turbine 92 and a compressor 94 coupled on a common shaft 96. The blades of turbine 92 may be caused to rotate about the common shaft 96 as a portion of the exhaust gas stream or flow discharged from engine 10 impinges upon the blades of the turbine. Compressor 94 may be coupled to turbine 92 such that compressor 94 may be actuated when the blades of turbine 92 are caused to rotate. When actuated, compressor 94 may then direct pressurized fresh gas to air intake passage 28 where it may then be directed to engine 10. The speed of the turbine may be inferred from one or more engine operating conditions. In some examples, the rotational speed of the turbine 92 may be measured with a sensor. For example a speed sensor 97 may be coupled with common shaft 96. A signal indicative of the speed may be delivered, for example, to the controller 12.

Turbine 92 may include at least one wastegate to control an amount of boost provided by said turbine. In a dual scroll system, both scrolls may share a wastegate to control an amount of exhaust gas which passes through turbine 92. For example, in FIG. 1, the first scroll 100 and second scroll 102 include a wastegate passage 104. Exhaust flow through wastegate passage 104 may be controlled by a valve, such as a valve 140 discussed below, to regulate the amount of exhaust gas bypassing turbine 92. In one embodiment, an area of an opening of the wastegate passage 104 may be positioned equally open to each of the scrolls, such that substantially similar amounts of exhaust gas flow may exit each of the scrolls into wastegate passage 104 during some conditions.

Engine 10 may employ a dual scroll (or twin scroll or two-pulse) turbocharger system 98 wherein at least two separate exhaust gas entry paths flow into and through turbine 92. A dual scroll turbocharger system may be configured to separate exhaust gas from cylinders whose exhaust gas pulses interfere with each other when supplied to turbine 92. For example, FIG. 1 shows a first scroll 100 and a second scroll 102, wherein each of the first scroll and second scroll may be used to supply separate exhaust flow to turbine 92. The cross-sectional shape of first scroll 100 and second scroll 102 may be of various shapes, including circular, square, rectangular, D-shaped, etc.

For example, if a four-cylinder engine (e.g., an I4 engine such as shown in FIG. 1) has a firing sequence of 1-3-4-2 (e.g., cylinder 20 followed by cylinder 24 followed by cylinder 26 followed by cylinder 22), then cylinder 20 may be ending its expansion stroke and opening its exhaust valves while cylinder 22 still has its exhaust valves open. In a single-scroll or undivided exhaust manifold, the exhaust gas pressure pulse from cylinder 20 may interfere with the ability of cylinder 22 to expel its exhaust gases. However, by using a dual scroll turbocharger system, wherein exhaust ports 40 and 46 from cylinders 20 and 26 are connected to one inlet of the first scroll 100, and exhaust ports 42 and 44 from cylinders 22 and 24 are connected to the second scroll 102, exhaust pulses or gas flow may be separated, and pulse energy driving the turbine may be increased.

Exhaust gases exiting turbine 92 and/or a wastegate via wastegate passage 104 may pass through an emission control device 112. Emission control device 112 can include multiple catalyst bricks, in one example. In another example, multiple emission control devices, each with multiple bricks, can be used. In some examples, emission control device 112 may be a three-way type catalyst. In other examples, emission control device 112 may include one or a plurality of a diesel oxidation catalyst (DOC), selective catalytic reduction catalyst (SCR), and a diesel particulate filter (DPF). After passing through emission control device 112, exhaust gas may be directed to a tailpipe 114.

Engine 10 may include an exhaust gas recirculation (EGR) system 116. EGR system 116 may deliver a portion of exhaust gas exiting engine 10 into the engine air intake passage 30. The EGR system includes an EGR conduit 118 coupled to a conduit or exhaust passage 122, downstream of the turbine 92, and to the intake passage 30. In some examples, EGR conduit 118 may include an EGR valve 120 configured to control an amount of recirculated exhaust gas. As shown in FIG. 1, EGR system 116 is a low pressure EGR system, routing exhaust gas from downstream of the turbine 92 to upstream of the compressor 94. In some examples, an EGR cooler (not shown) may be placed along EGR conduit 118 which may serve to reduce the temperature of the exhaust gas being re-circulated. In another example, a high pressure EGR system may be used in addition to or in place of the low pressure EGR system. As such, the high pressure EGR system may route exhaust gas from one or more of the first scroll 100 and second scroll 102, upstream of the turbine 92, to the intake passage 30, downstream of the compressor 34.

Under some conditions, EGR system 116 may be used to regulate the temperature and or dilution of the air and fuel mixture within the combustion chambers, thus providing a method of controlling the timing of ignition during some combustion modes. Further, during some conditions, a portion of combustion gases may be retained or trapped in the combustion chamber by controlling exhaust valve timing.

In some examples, controller 12 may be a microcomputer, including a microprocessor unit, input/output ports, an electronic storage medium for executable programs and calibration values, random access memory, keep alive memory, and a data bus. As depicted, controller 12 may receive input from a plurality of sensors, which may include user inputs and/or sensors (such as transmission gear position, gas pedal input, exhaust manifold temperature, air-fuel ratio, vehicle speed, engine speed, mass airflow through the engine, ambient temperature, ambient humidity, intake air temperature, cooling system sensors, and others). The controller may also send a plurality of control signals to various engine actuators (not shown) in order to adjust engine operation based on signals received from the sensors (not shown). In this example, input device 16 includes an accelerator pedal and a pedal position sensor 18 for generating a proportional pedal position signal PP. Further, controller 12 is shown in FIG. 1 receiving various signals from sensors coupled to engine 10, in addition to those signals previously discussed, including: engine coolant temperature (ECT) from a temperature sensor 128; an engine position sensor 130, e.g., a Hall effect sensor sensing crankshaft position. Barometric pressure may also be sensed (sensor not shown) for processing by controller 12. In some examples, engine position sensor 130 produces a predetermined number of equally spaced pulses every revolution of the crankshaft from which engine speed (RPM) can be determined. Additionally, various sensors may be employed to determine turbocharger boost pressure. For example, a pressure sensor 132 may be disposed in intake passage 30 downstream of compressor 94 to determine boost pressure. Additionally, each scroll of the dual scroll system 98 may include various sensors for monitoring operating conditions of the dual scroll system. For example, the first scroll 100 may include an exhaust gas sensor 134 and the second scroll 102 may include an exhaust gas sensor 136. Exhaust gas sensors 134 and 136 may be any suitable sensor for providing an indication of exhaust gas air/fuel ratio such as a linear oxygen sensor or UEGO (universal or wide-range exhaust gas oxygen), a two-state oxygen sensor or EGO, a HEGO (heated EGO), a NOx, HC, or CO sensor. In some cases a single sensor may be used to, for example, sense an air/fuel ratio. The single sensor may be used in place of using sensors 134 and 136, and may be positioned, for example, downstream from the turbine in the conduit or exhaust passage 122.

Each scroll may receive exhaust gas from a specific set of cylinder via specific exhaust manifold segments and distinct inlets. Exhaust gases flowing through the first scroll 100 and exhaust gases flowing through the second scroll 102 are separated by a dividing wall 138. As discussed above, separating exhaust gas flow (i.e. exhaust gas pulses) in the first and second scrolls may increase low-end engine torque and reduce a duration desired to achieve said torque. As a result, during certain conditions such as high engine load, separating the exhaust gas pulses may result in an increase in efficiency of exhaust gas flow delivery to a turbine. However, during some engine operating conditions, separating exhaust gas pulses as described above may reduce the efficiency of exhaust gas delivery to the turbine. For example, during high engine speed, separating exhaust gas pulses as described above may increase backpressure and pumping work due, in part, to a smaller, more restrictive lower scroll volume between the exhaust valve and the turbine compared to a combined, unseparated single turbine inlet scroll. In other words, a volume of exhaust gas exiting the cylinder(s) may raise the pressure more in the aforementioned dual scroll configuration, since the separated first scroll and second scroll may have a relatively smaller volume as compared to a scroll configuration where the scrolls or passages are not separated. In response, engine power output may be reduced.

Increasing fluid communication and conveyance between the first and second scrolls during certain engine operating conditions, such as high speed and/or high load, may allow increased engine efficiency and power output. Thus, a passage 139 may fluidically bridge the first scroll 100 and the second scroll 102, such that an amount of exhaust gas in the first scroll 100 may flow to the second scroll 102, and mix with an amount of exhaust gas in the second scroll 102. Likewise, an amount of exhaust gas in the second scroll 102 may flow to the first scroll 100, and mix with an amount of exhaust gas in the second scroll 102. Further, a valve 140 may be provided within passage 139 positioned within dividing wall 138 to allow fluid communication and conveyance between the first and second scroll during certain engine operating condition. In another example, the valve 140 may be disposed at an opening of the dividing wall. Moreover, the valve may be positionable or adjustable via one or more signals received from controller 12 in a continuous manner through selected positions or ranges, discussed below.

In one embodiment, valve 140 may be referred to as a combined branch communication valve and wastegate valve 140, or simply as valve 140. As such, the term "valve" as used herein may be understood to mean an obstruction, which may be movable or positionable to control a flow of fluid, and may be understood to mean a movable obstruction, which may be housed in and/or coupled with various components such as a housing or body, etc. As shown in the example embodiment illustrated in FIGS. 1-2, valve 140 may be positioned such that the valve bridges the first scroll 100 and the second scroll 102. As such, in one example, opening valve 140 may provide a passage to increase fluid communication and conveyance between the first and second scrolls of the turbine. Further, the valve 140 may be opened a metered amount to each of the first and second scrolls, such that fluid communication may be restricted to a desired amount. In this way, only a portion of the amount of exhaust gas may flow between the first and second scrolls. In another example, valve 140 may be completely or fully opened such that there may be a larger amount of exhaust gas flow and fluid communication between the first and second scrolls, compared to the portion of the amount of exhaust gas flow when the valve 140 is opened a metered amount.

In yet another example, closing the valve 140 may decrease fluid communication and conveyance between the first and second scrolls. In some cases, the valve may be completely or fully closed such that considerably no exhaust gas may communicate between the first and second scrolls. In other words, substantially all exhaust gas flow within the first scroll and all exhaust flow within the second scroll may separate and independently directed to the turbine, such as turbine 92. As shown in FIGS. 1-2, embodiments of valve 140 described herein may be used in the first scroll and/or the second scroll within the turbocharger housing assembly and/or in the exhaust passages (e.g., first scroll 100 and/or second scroll 102 leading to an inlet of the turbocharger).

Thus, the valve may be adjusted between selected positions. For example, valve 140 may be movable between four selected positions, as shown in reference to FIGS. 3A-4D. In this example, a first set of the selected positions may provide fluid communication and conveyance between the first scroll 100 and the second scroll 102. Moreover, a second set of the selected positions may provide fluid communication and conveyance between one or both of the first scroll 100 and second scroll 102 and a point 106 downstream from turbine 92.

As a result, adjustments to a position of valve 140 may control a rotational speed of the turbine 92, as described, and in turn, regulate the speed of compressor 94. Thus, in some embodiments, only a single element, such as valve 140, may provide both control of exhaust gas through the wastegate passage 104, and controlled fluidic communication and conveyance between two or more scrolls that may be present in engine 10. Increasing fluid communication and conveyance may include allowing exhaust gas from the first scroll 100 and exhaust gas from the second scroll 102 to mix and enter an opposite or other scroll(s). In one example, wastegate control may include allowing at least a portion of exhaust gas from each of first scroll 100 and second scroll 102 to enter wastegate passage 104, thereby bypassing turbine 92. In other examples, wastegate control may include closing the wastegate to prevent substantially all exhaust gas from the first and second scrolls (and/or additional scroll(s)) from bypassing the turbine. Since the position of valve 140 may control the rotational speed of the turbine, in some examples, the amount of opening of valve 140 (e.g., a metered or prescribed amount, or fully opened or fully closed) to each of the first and second scrolls, and/or to the wastegate passage may be based on one or more engine operating conditions, such as engine speed, engine load, desired or demanded torque, and/or increasing or decreasing torque.

Turning now to FIG. 2, another example embodiment of the dual scroll turbocharger system 98 is shown. Other arrangements not specifically illustrated may also be possible in accordance with the present disclosure. Similar to FIG. 1, dual scroll turbocharger system 98 may include first scroll 100 and second scroll 102. In one embodiment, second scroll 102 may be fluidically separated from first scroll 100 by the dividing wall 138, and passage 139 may fluidically bridge the first scroll 100 and the second scroll 102, such that an amount of exhaust gas within each of the first scroll 100 and the second scroll 102 may mix with an amount of exhaust gas in the opposite scroll. In some embodiments, by adjusting valve 140 based on engine operating conditions, the turbine may be operated in varying modes, and the dynamic range over which boost can be provided by the turbocharger is enhanced. In addition, the aforementioned arrangements may reduce weight, cost, and/or package penalties.

As shown in FIG. 2, valve 140 may be integrated into, or co-located with, cylinder head 39 of engine 10 configured to use turbocharger system 98. In another example, valve 140 may be integrated into, or co-located with, an exhaust manifold 41 of engine 10 configured to use turbocharger system 98. In another example, valve 140 may be integrated into cylinder head 39 containing the integrated exhaust manifold 41. Alternatively, in yet another example, valve 140 may be integrated into turbocharger 90 of engine 10 configured to use turbocharger system 98. Further, valve 140 may be integrated into a valve engagement piece (not shown) specifically used to hold valve 140 securely in place. In some embodiments, valve 140 may include a valve body. The valve 140 may include one or more external surfaces to allow heat to dissipate from the valve body into a surrounding environment. Thus, thermal degradation of the valve may be reduced.

Now referring to FIGS. 3A-3D, sectional views of a first example branch communication and wastegate valve in four example positions or states are shown. The first scroll 100, herein also termed the first passage, may be in front, behind, or above a second scroll 102, herein termed the second passage, as viewed from the plane of the paper. In one embodiment, the sectional views may be viewed or perceived through a center of a scroll, such as the first scroll 100. The other scroll, e.g., second scroll 102, may be in front or behind the plane of the sectional views.

As illustrated in FIGS. 3A-3D, valve 140 may be a cylindrical valve 140. In this embodiment, valve 140 may rotate on an axis 141 substantially perpendicular to a flow of exhaust gas (and as illustrated, the valve may rotate perpendicular to the plane of the paper) within each of the first scroll 100 and the second scroll 102. Further, in this embodiment, valve 140 may include an element 147 that rotates on axis 141 substantially perpendicular to the exhaust flow within each of the first and second scrolls. In one example, cylindrical valve 140 may be positioned at least in an area substantially adjacent to, and share at least an interface with the first scroll 100 and the second scroll 102. In this way, valve 140 may provide selective fluidic communication and conveyance between one or more combinations of first scroll 100, second scroll 102, and the wastegate passage 104 to point 106 (depicted above in FIGS. 1-2) downstream from turbine 92.

In one embodiment, valve 140 may be adjusted and movable in a continuous manner through selected ranges, positions, or states, as described in detail in FIGS. 3A-3D and 4A-4B. Further, exhaust flow through the first and/or second scroll may be adjusted based on engine operating conditions, such as engine speed and load, and/or desired boost pressure and torque. For example, the position of the valve 140 may be adjusted such the boost pressure (i.e. compressor outlet pressure) may be sufficient to meet, but not to exceed, a desired boost pressure. In one example, if a measured boost pressure is higher than the desired boost pressure, the valve may be adjusted to increase an amount of exhaust gas flow that bypasses the turbine. In other words, the exhaust gas flow may be directed to point 106 downstream of the turbine. As a result, there may be a reduction in the rotational speed of the turbine and compressor, thereby reducing boost pressure. On the other hand, if the boost pressure is lower than the desired boost pressure, the valve 140 may be adjusted to decrease the amount of exhaust gas flow bypassing the turbine by providing a metered amount of opening to the wastegate passage. Consequently, there may be an increase in the rotational speed of the turbine and compressor, thereby increasing boost pressure. In another example, if the turbine speed exceeds a predetermined threshold speed, the valve may be adjusted to decrease the amount of exhaust gas to the turbine in order to reduce damage to the turbocharger.

Figure 3A:
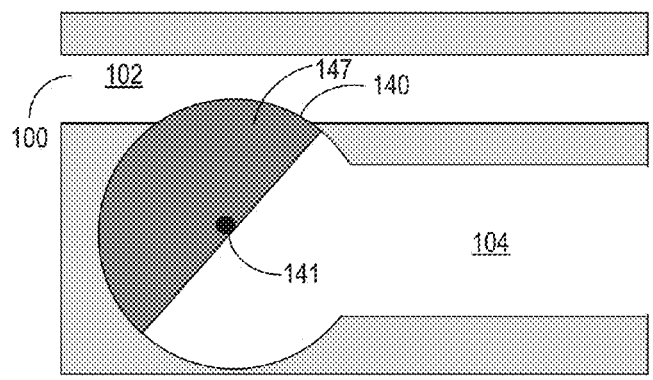
FIGS. 3A-3D show sectional views of an example branch communication and wastegate valve in four example positions or states.

As shown in FIG. 3A, an example first position of valve 140 is shown, wherein valve 140 may adjusted to be closed such that substantially all exhaust flow within the first scroll 100 may be substantially contained within the first scroll 100 and may be passed to turbine 92. Further, substantially all exhaust flow within second scroll 102 may be substantially contained within second scroll 102 and may be passed to turbine 92. Additionally, the first position of valve 140 may also reduce or prevent exhaust flow from entering wastegate passage 104. In this way, adjusting the valve to the first position may increase the amount of exhaust flow to the turbine by preventing exhaust fluid communication between the first and second scrolls, and from the first and second scrolls to the wastegate passage. Thus, in the first position, the valve may be completely closed to each of the first scroll, second scroll, and the wastegate passage such that a vast majority or nearly all exhaust gas flow in the first scroll 100 and in the second scroll 102 may be separately and independently delivered to turbine 92. Further, no exhaust gas flow may bypass the turbine via wastegate passage 104. In one example, the valve 140 may be in the first position, or a position substantially similar to the first position, during a condition when one or more of turbine speed is less than a threshold turbine speed, boost pressure is less than a desired boost pressure, engine load is greater than a threshold load, torque demand is increasing, and engine speed is less than a threshold engine speed.

Herein, the aforementioned threshold turbine speed may be a speed at or above which mechanical damage on the turbine may occur, for example. In another example, the threshold load may be an engine load above which it may be considered a high engine load condition, such as when the vehicle is towing a trailer or hill-climbing. In yet another example, the threshold engine speed may be a speed at or above which excessive engine exhaust backpressure may occur in a dual scroll turbocharger system. In other examples, the threshold load, threshold turbine speed, and/or threshold engine speed may be based on other engine operating conditions.

Figure 3B:
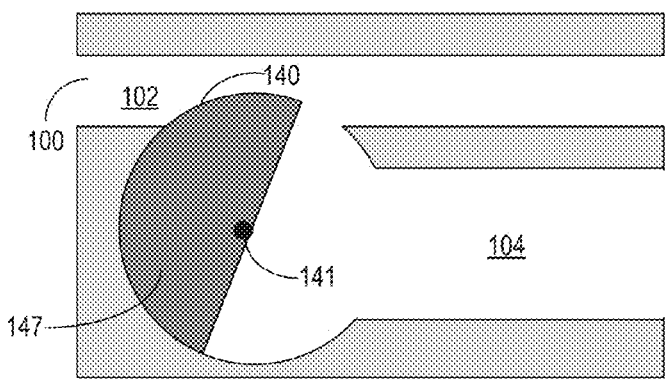

In another example, as illustrated in FIG. 3B, an example second position of valve 140 is provided, wherein valve 140 may be opened a metered amount to each of the first and second scrolls, and completely opened to the wastegate passage. As such, valve 140 in the second position may enable partial communication of exhaust flow between the first and second scrolls, and full communication of exhaust flow from between each of the first and second scrolls and to the wastegate passage. In other words, valve 140 may be opened the metered amount to each of the first and second scrolls such that an amount of exhaust gas flow at an interface between each of the first scroll 100 and second scroll 102 may exit the first scroll 100 and second scroll 102, respectively, and bypass turbine 92 via wastegate passage 104. Further, in this example, valve 140 in the second position may reduce exhaust flow communication and conveyance between the first scroll 100 and the second scroll 102 since the metered amount of opening of valve 140 may be limited.

In one example, valve 140 may be in the second position, or a position substantially similar to the second position, when one or more of turbine speed is greater than the threshold turbine speed, boost pressure is greater than the desired boost pressure, engine load is less than the threshold load, demanded torque is decreasing, and engine speed is less than the threshold engine speed. In another example, the metered amount of opening of valve 140 may be based on engine speed, engine load, and/or demanded torque. As such, in an example, the metered amount of opening of valve 140 to each of the first and second scrolls may increase as engine load or demanded torque decreases. In another example, the metered amount of opening of valve 140 to each of the first and second scrolls may increase as engine speed increases. In this way, valve 140 in the second position may enable a desired amount of exhaust flow to exit each of the first and second scrolls to enter the wastegate passage 104 and bypass turbine 92 responsive to one or more engine operating conditions.

Figure 3C:
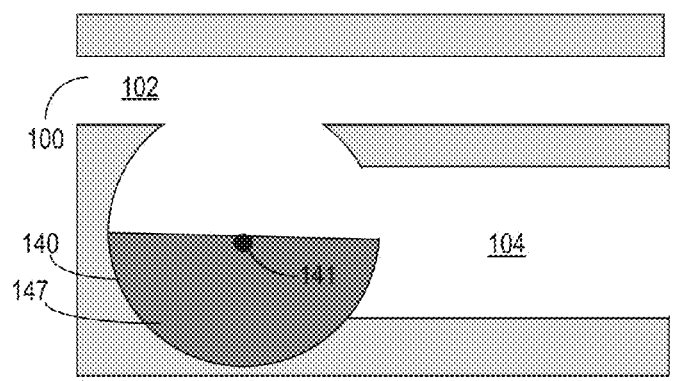

Now turning to FIG. 3C, an example third position of valve 140 is shown, wherein valve 140 may be adjusted to be substantially opened to each of the first scroll 100 and second scroll 102, and opened a prescribed amount to wastegate passage 104. Moreover, a space having a volume formed at an area between and adjacent to each of the first scroll and second scroll may be present when the valve is in the third position. As such, the valve in the third position may allow exhaust gas flow in each of the first scroll 100 and second scroll 102 to "blow down" into the aforementioned space having a larger volume as compared to a volume of space in each of the first scroll and second scroll when the valve is closed to each of the first scroll and second scroll, such as the first position. Consequently, valve 140 in the third position may allow considerable exhaust flow communication and conveyance between the first scroll 100 and the second scroll 102. Concomitantly, a portion of exhaust gas flow may escape through the prescribed amount of opening of valve 140 to wastegate passage 104. Thus, there may be a reduction in exhaust gas flow to the turbine 92. In one example, the valve 140 may be in the third position to allow the portion of exhaust gas flow to bypass the turbine to limit boost pressure and/or to maintain or reduce a speed of a turbine below a threshold turbine speed.

In one embodiment, the prescribed amount of opening of valve 140 may be based on engine operating conditions, such as engine speed, engine load, and/or demanded torque. For example, valve 140 may be in the third position when the turbine speed is greater than the threshold turbine speed. In another example, the valve may be in the third position during a condition when one or more of boost pressure is greater than the desired boost pressure, engine load is less than the threshold load, demanded torque is decreasing, and engine speed is greater than the threshold engine speed. In yet another example, the prescribed amount of opening of valve 140 to the wastegate passage 104 may increase as engine load or demanded torque decreases. In some cases, the prescribed amount of opening of valve 140 to wastegate passage 104 may increase as engine speed decreases. In this way, valve 140 may be movable to the third position to reduce boost pressure responsive to certain engine operating conditions in order to mitigate exhaust manifold backpressure.

Figure 3D:
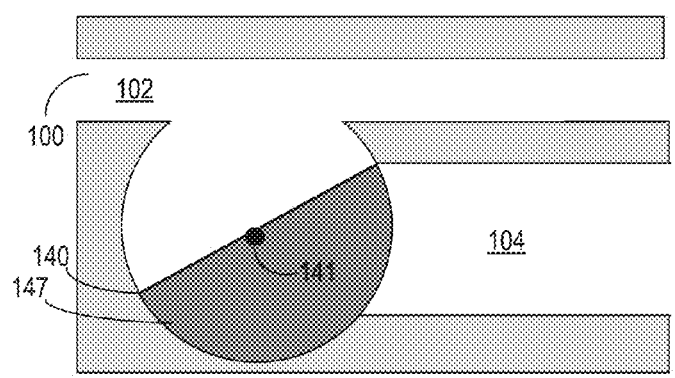

FIG. 3D illustrates an example fourth position of valve 140, wherein valve 140 is substantially or completely opened to each of the first scroll 100 and second scroll 102. In addition, valve 140 may be closed to the wastegate passage 104, such that no exhaust gas flow may exit each of the first and second scrolls to wastegate passage 104. Consequently, valve 140 in the fourth position may allow considerable exhaust flow communication and conveyance between the first scroll 100 and the second scroll 102.

Moreover, similar to the third position, a space having a volume formed at an interface between and/or an area adjacent to each of the first scroll and second scroll when the valve is in the fourth position may allow exhaust gas flow in the first scroll 100 and second scroll 102 to "blow down" into said space having a larger volume as compared to the volume in each individual scroll and when the valve is closed to each of the first scroll and second scroll. In this way, valve 140 in the fourth position may allow full exhaust flow communication and conveyance between first scroll 100 and second scroll 102, such that all exhaust flow passes through the turbine to increase boost pressure. Consequently, the fourth position may reduce exhaust backpressure, while increasing exhaust gas flow and energy to the turbine to increase boost pressure more rapidly.

In one example, the valve 140 may be in the fourth position, or a position substantially similar to the fourth position, during a condition when one or more of turbine speed is less than a threshold turbine speed, boost pressure is less than a desired boost pressure, engine load is greater than a threshold load, torque demand is increasing, and engine speed is greater than a threshold engine speed. Said another way, the aforementioned valve configuration may provide an amount of boost pressure to achieve the desired boost pressure while reducing exhaust manifold backpressure during high engine speeds. Although not shown, other additional and/or alternative positions, or states, or ranges are possible in accordance with the present disclosure.

Turning now to FIGS. 4A-4D, sectional views of a second example branch communication and wastegate valve in four example positions or states are shown. In one embodiment, a first passage, or first scroll 100, may be positioned at a spaced distance adjacent to a second passage, or second scroll 102, as viewed from the plane of the paper. In one embodiment, valve 140 may be adjusted, or movable, in a continuous manner through selected positions, ranges, and/or states such that exhaust gas flow through the first and second scrolls, and to the wastegate passage, may be adjusted based on engine operating conditions and desired boost and torque, for example. As illustrated in FIGS. 4A-4D, in one embodiment, valve 140 may comprise a spool valve. In this embodiment, valve 140 may include a movable element 143 configured to move along an axis 149 to provide selective fluidic communication and conveyance between one or more combinations of first scroll 100, second scroll 102, and wastegate passage 104 to point 106 (depicted above in FIGS. 1-2) downstream from turbine 92.

In one embodiment, the aforementioned example positions shown in reference to FIGS. 4A-4D may be substantially the same as the example positions illustrated in FIGS. 3A-3D, such that adjustments to a position of a valve, such as valve 140, may control exhaust gas flow in one or more of the first scroll, second scroll, and the wastegate passage.

Figure 4A:
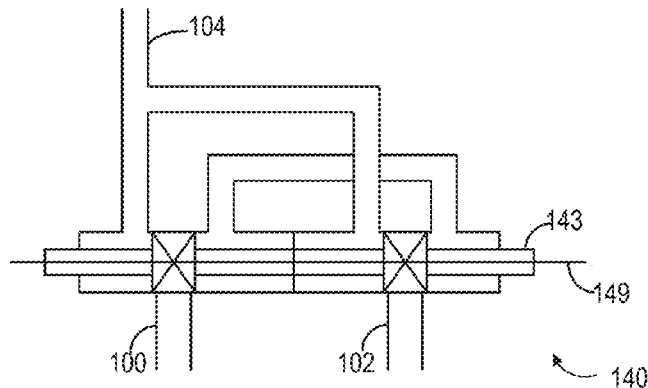
FIGS. 4A-4D show sectional views of another example branch communication and wastegate valve in four example positions or states.

For example, as shown in FIG. 4A, a first position of valve 140 having a spool configuration may be substantially similar to the first position of valve 140 having a cylindrical configuration described in FIG. 3A. As such, valve 140 may be closed such that substantially all exhaust flow within first scroll 100 may be substantially contained within the first scroll 100 and may be passed to turbine 92. Similarly, substantially all exhaust flow within second scroll 102 may be substantially contained within second scroll 102 and may be passed to turbine 92, as shown in reference to FIGS. 1-2. Moreover, no exhaust gas flow may bypass the turbine through wastegate passage 104. Similar to valve 140 described in FIG. 3A, valve 140 having the spool configuration may be in the first position, or a position substantially similar to the first position, during a condition when one or more of turbine speed is less than the threshold turbine speed, boost pressure is less than the desired boost pressure, engine load is greater than the threshold load, torque demand is increasing, and engine speed is less than the threshold engine speed. In this way, adjustment to valve 140 to the first position increases an amount of exhaust gas flow to the turbine, thereby increasing boost pressure.

Figure 4B:
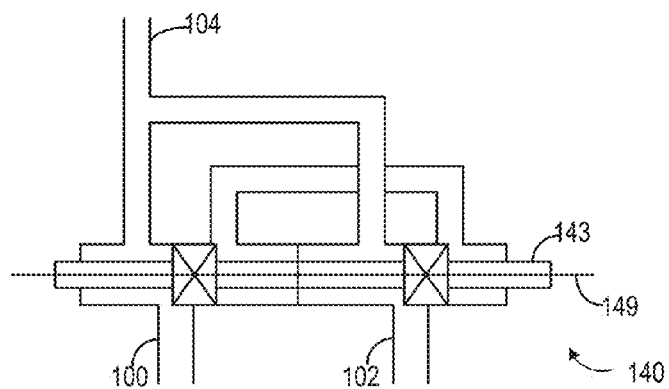

In another example, as illustrated in FIG. 4B, a second position of valve 140 having the spool configuration is shown, which may be substantially similar to the second position described in FIG. 3B. In particular, valve 140 having the spool configuration may be opened a metered amount to each of the first and second scrolls, and opened completely to wastegate passage 104. As such, valve 140 in the second position may enable partial communication of exhaust flow between the first and second scrolls, and full fluid communication of exhaust flow from between each of the first and second scrolls and to the wastegate passage. Thus, a portion of exhaust gas flow at an interface of each of the first scroll 100 and second scroll 102 may exit the first scroll 100 and second scroll 102, respectively, and bypass turbine 92 via wastegate passage 104. In this way, adjustment to valve 140 to the second position may decrease an amount of exhaust gas flow to the turbine, thereby limiting or lowering boost pressure.

In one example, valve 140 having the spool configuration may be in the second position, or a position substantially similar to the second position, when one or more of turbine speed is greater than the threshold turbine speed, boost pressure is greater than the desired boost pressure, engine load is less than the threshold load, demanded torque is decreasing, and/or engine speed is less than the threshold engine speed. Similar to the valve illustrated in FIG. 3B, the metered amount of opening of valve 140 having the spool configuration may be based on engine speed, engine load, and/or demanded torque. For example, the metered amount of opening of valve 140 to each of the first and second scrolls may increase as engine load or demanded torque decreases. In another example, the metered amount of opening of valve 140 to each of the first and second scrolls may increase as engine speed increases.

Figure 4C:
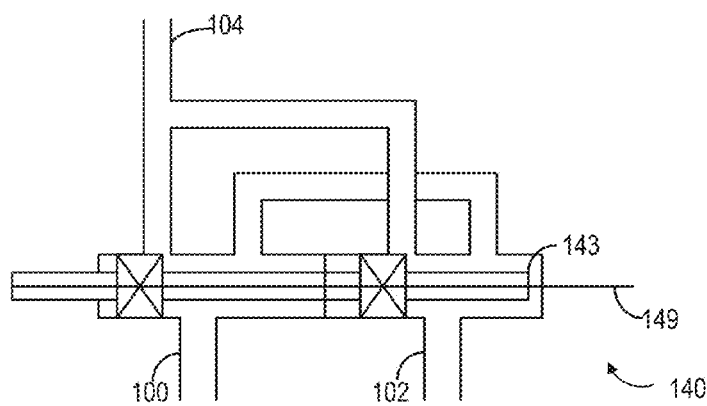

Now turning to FIG. 4C, a third position of valve 140 having the spool configuration is shown, which may be substantially similar to the third position described in FIG. 3C. In one example, in the third position, valve 140 may be opened completely to each of the first scroll 100 and second scroll 102, and opened a prescribed amount to wastegate passage 104. As a result, valve 140 in the third position may allow substantial exhaust flow communication and conveyance between the first scroll 100 and the second scroll 102. Concomitantly, a portion of exhaust gas flow may escape through the prescribed amount of opening and into wastegate passage 104. Thus, there may be a reduction in exhaust gas flow to the turbine 92. In this way, adjustment of valve 140 to the third position may limit or lower boost pressure.

In an example, the valve may be in the third position during a condition when one or more of turbine speed is greater than the threshold turbine speed, boost pressure is greater than the desired boost pressure, engine load is less than the threshold load, demanded torque is decreasing, and/or engine speed is greater than the threshold engine speed. Similar to the third position of FIG. 3C, the prescribed amount of opening of valve 140 shown in FIG. 4C may be based on engine operating conditions, such as engine speed, engine load, and/or demanded torque. In yet another example, the prescribed amount of opening of valve 140 to wastegate passage 104 may increase as engine load or demanded torque decreases. In some cases, the prescribed amount of opening of valve 140 to wastegate passage 104 may increase as engine speed decreases. In this way, valve 140 may be movable to the third position to reduce boost pressure responsive to certain engine operating conditions in order to mitigate exhaust manifold backpressure during high engine speeds.

Figure 4D:
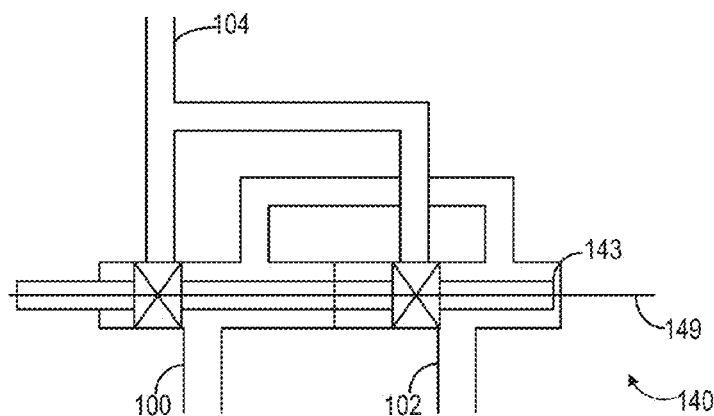

Now turning to FIG. 4D, a fourth position of valve 140 having the spool configuration is shown, which may be substantially similar to the fourth position described in FIG. 3D. In one example, valve 140 is substantially or completely opened to each of the first scroll 100 and second scroll 102, and closed to wastegate passage 104. As a result, in the fourth position, valve 140 may allow full exhaust flow communication and conveyance between first scroll 100 and second scroll 102 such that substantially all exhaust flow within each scroll passes through the turbine to increase boost pressure. In this way, adjustment to valve 140 to the fourth position may increase an amount of exhaust gas flow to the turbine, thereby increasing boost pressure.

In one example, the valve 140 may be in the fourth position, or a position substantially similar to the fourth position, during a condition when one or more of turbine speed is less than a threshold turbine speed, boost pressure is less than a desired boost pressure, engine load is greater than a threshold load, torque demand is increasing, and/or engine speed is greater than a threshold engine speed. Said another way, in another example, the fourth valve position may provide an amount of boost pressure to achieve the desired or target boost pressure while reducing exhaust manifold backpressure during high engine speeds. Although not shown, other positions, states, or ranges are possible in accordance with the present disclosure.

Thus, in one embodiment, a dual scroll turbocharger system may be provided, comprising a first scroll, a second scroll, fluidically separated from the first scroll via a dividing wall, a passage positioned within the dividing wall fluidically bridging the first scroll and the second scroll, and a valve positioned within the passage and movable between selected positions, a set of the selected positions providing fluid communication between the first scroll and the second scroll, and a second set of the selected positions providing fluid communication between one or both of the first and second scrolls and a point downstream from a turbine.

In one example, the valve may be positionable in a continuous manner through the selected positions, the selected positions including: a first position wherein the valve may be closed to each of the first and second scrolls, and closed to the point downstream from the turbine; a second position wherein the valve may be opened a metered amount to each of the first and second scrolls, and opened to the point downstream from the turbine; a third position wherein the valve may be opened completely to each of the first and second scrolls, and opened a prescribed amount to the point downstream from the turbine; and a fourth position wherein the valve may be opened completely to each of the first and second scrolls, and closed to the point downstream from the turbine.

Further, in an example, the valve may be integrated into a cylinder head. In other example, the valve may be integrated in a turbocharger or an exhaust manifold of an engine configured to use the turbocharger system. In one embodiment, the valve may include a valve body, wherein the valve includes one or more external surfaces disposed to allow heat to be removed from the valve body. The valve may also include an attachment mechanism, such as fasteners and/or a sealing arrangement for fluidic coupling with the engine.

Figure 5:
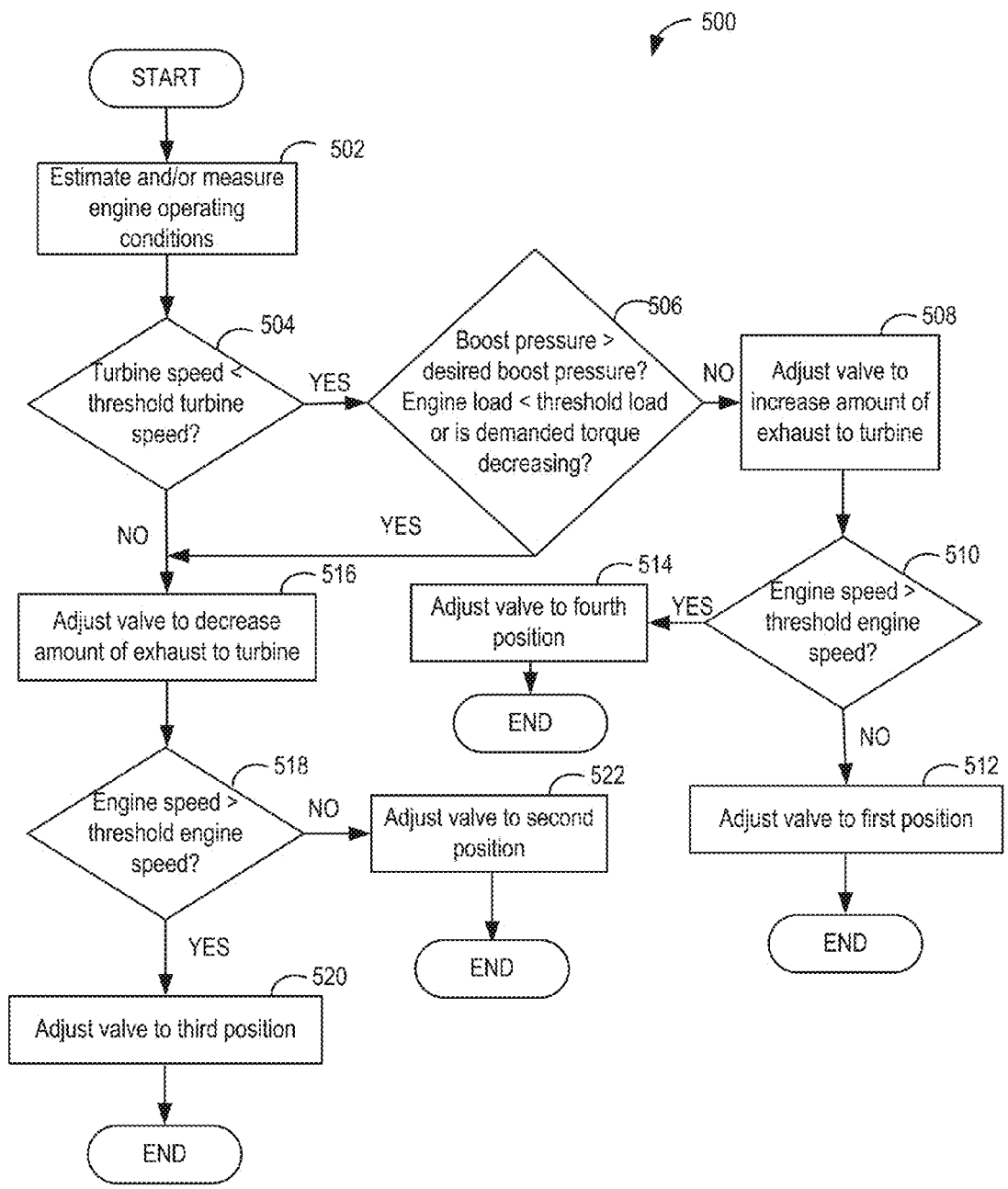
FIG. 5 shows an example method for adjusting a branch communication and wastegate valve.
Figure 6:
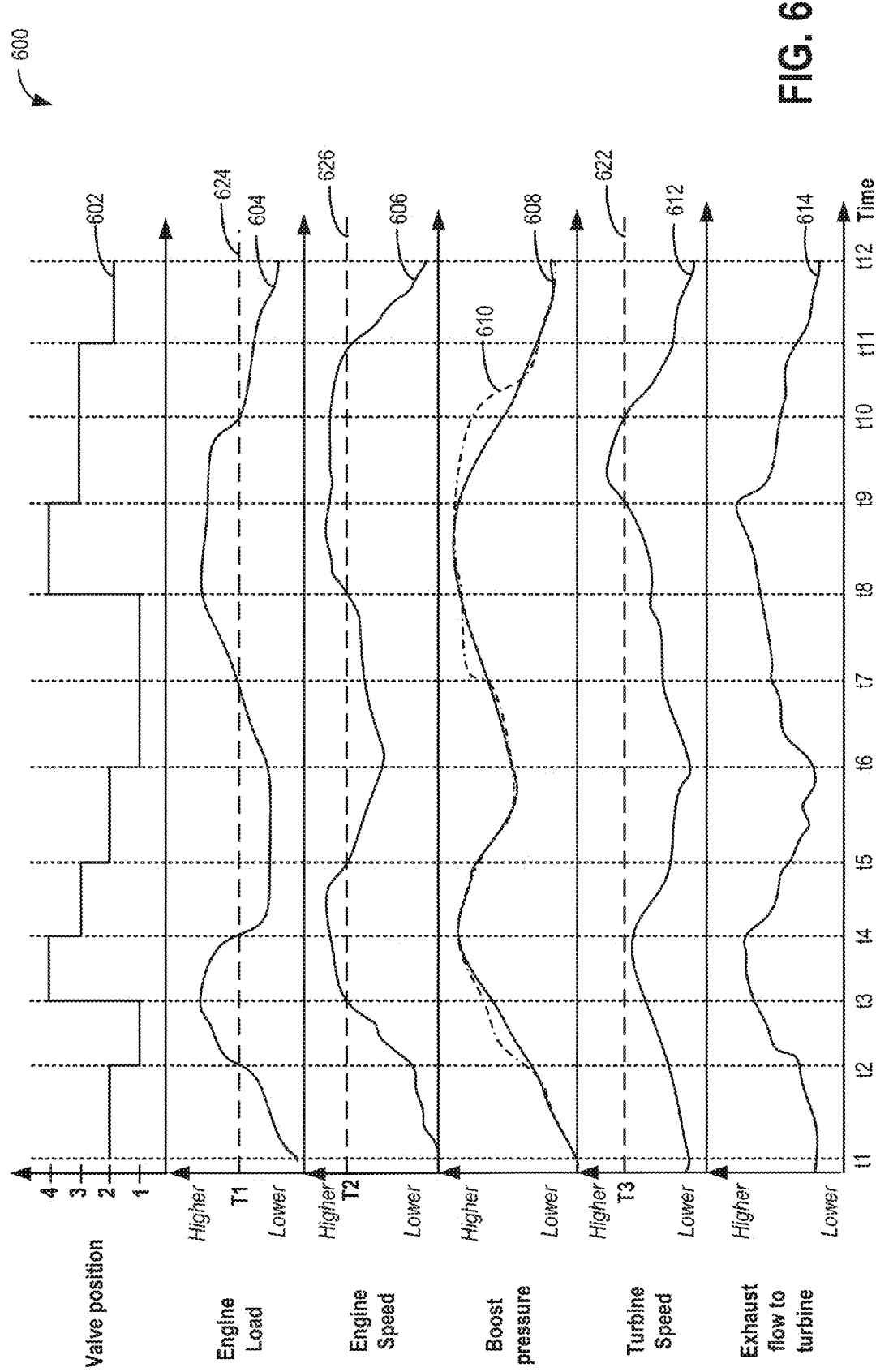
FIG. 6 shows an example operation plot for adjusting a branch communication and wastegate valve responsive to engine operating conditions.

FIG. 5 is a flow diagram illustrating an example routine 500 for adjusting one or more movable obstructions that are adjustable or positionable, such as valve 140 shown in FIGS. 1-4, to provide multiple positions of directing exhaust gas to pass from the first turbine inlet scroll (e.g., first scroll 100) and/or from the second turbine inlet scroll (e.g., second scroll 102) to a turbine (e.g., turbine 92) and/or to a wastegate (e.g., wastegate passage 104). Specifically, a position of the valve may be adjusted based on one or more engine operating conditions and/or desired or demanded engine operations. For example, a position of the valve may be responsive to an engine speed and load, and a demanded torque requested by an operator of a vehicle. Instructions for carrying out routine 500 may be stored in a memory of a controller, such as controller 12 shown in FIGS. 1-2.

At 502, the routine includes estimating and/or measuring engine operating conditions such as engine speed, load, boost, MAP, demanded boost pressure, etc. At 504, it may be determined if a speed of a turbine, such as turbine 92, for example, is below a pre-determined threshold speed. In one example, the threshold turbine speed may be a speed at which the turbine output may reduce engine performance and/or damage the turbocharger or other engine components. In another example, a speed sensor, such as speed sensor 97, may measure the speed of the turbine. Alternatively, the speed of the turbine may be estimated based one or more engine operating conditions. In this way, if a turbine speed exceeds the pre-determined threshold speed, the valve, e.g., valve 140, may be adjusted to reduce damage to the turbocharger and/or increase engine performance. In another embodiment, other engine operating condition(s) may be compared and confirmed to a corresponding threshold value in place of comparing a turbine speed to a threshold turbine speed.

If it is confirmed that the speed of the turbine is less than the threshold turbine speed at 504, the routine continues to 506, where it is confirmed if a measured boost pressure is above a target or desired boost pressure. In another example, at 506, it may be additionally or alternatively be confirmed if engine load is less than a threshold engine load, wherein the threshold load may be an engine load at or above which high engine load may be present, such as during hill-climbing or towing, for example. In other words, the threshold engine load may be a condition above which high engine load (torque) is demanded, wherein the high engine load may be based on various engine operating conditions. In yet another example, at 506, it may additionally or alternatively be confirmed if demanded torque is decreasing. If the measured boost pressure is below the desired boost pressure, the engine load is greater than the threshold load, and/or demanded torque is increasing, the routine may adjust the valve to increase an amount of exhaust gas to the turbine at 508. In other words, the routine may increase the amount of exhaust gas flow to the turbine in order to increase the measured boost pressure and/or engine torque to the desired boost pressure and/or engine torque, respectively.

Adjusting the valve to increase the amount of exhaust to the turbine may include adjusting the valve to one of the first position and the fourth position, as described above in FIGS. 3A and 3D, and 4A and 4D. As one example, the adjusting of the valve to increase the amount of exhaust gas flow to the turbine may be further determined by an engine speed at 510. As such, routine 500 may confirm if the engine speed is less than a pre-determined threshold engine speed. In one example, the threshold engine speed may be a speed or range of speeds at which increased backpressure in the exhaust manifold may occur. In other embodiments, the routine may confirm if one or more additional or alternative engine operating conditions, such as demanded torque or engine load, is greater than a corresponding pre-determined threshold. For example, the routine may confirm if increasing engine load (torque) is demanded and/or if engine load is greater than a threshold load in tandem with, before, or after determining if engine speed is greater than the threshold engine speed at 510.

In one embodiment, if the engine speed less than the threshold engine speed, routine may proceed to 512, and may adjust the valve to the first position, as described above with reference to FIGS. 3A and 4A. In another example, the valve may be adjusted to a position substantially similar to the first position, such that substantially all exhaust gas flow within each of the first scroll and the second scroll are directed to the turbine. Further, the valve may be simultaneously closed to any other scroll(s) and to the wastegate passage, e.g., wastegate passage 104. In this way, considerably all exhaust gas flow within each of the first and second scroll may drive the turbine in order to provide increased boost pressure to achieve the desired boost pressure when engine speed is less than the threshold engine speed (e.g., during low engine speed).

However, if it is confirmed at 510 that the engine speed (or other operating condition) is above the threshold engine speed (or other pre-determined threshold level), the routine may adjust the valve to the fourth position, for example, at

514, as described above with reference to FIGS. 3D and 4D. In another example, the valve may be adjusted to a position substantially similar to the fourth position, such that the valve may be fully opened to each of the first and second scrolls, and closed to the wastegate passage. In other words, a portion of exhaust gas flow in the first scroll 100 may mix and combine with a portion of exhaust gas flow in the second scroll 102. However, no amount of exhaust gas from either the first scroll 100 or second scroll 102 may exit either scroll via wastegate passage 104. Moreover, a space having a volume formed between an area adjacent to the first scroll and second scroll when the valve is in the fourth position may allow the portion of exhaust gas in the first scroll 100 and second scroll 102 to "blow down" into the larger volume space (as compared to the volume in each individual scroll when the valve is closed to each of the first scroll and second scroll). In this way, the valve in the fourth position, or a position substantially similar, may direct considerably all exhaust gas flow in the first and second scroll to drive the turbine. Thus, the aforementioned fourth valve position of valve 140 may provide increased boost pressure to achieve the desired boost pressure while reducing exhaust manifold backpressure when engine speed is greater than the threshold engine speed (e.g., during high engine speed).

On the other hand, if it is confirmed at 504 that the turbine speed is greater than the threshold turbine speed, or if it is confirmed at 506 that the measured boost pressure is greater than the desired or target boost pressure, the engine load is less than the threshold load, and/or that torque demand is decreasing, the routine may continue to 516, wherein the valve may be adjusted to decrease an amount or volume of exhaust gas flow to the turbine. In this way, in one example, adjusting the valve to decrease an amount of exhaust to the turbine may reduce potential damage to the turbocharger when turbine speed exceeds the threshold speed. In another example, adjusting the valve to decrease the amount of exhaust to the turbine when a boost pressure exceeds the desired boost pressure, when engine load is less than the threshold load, and/or when torque demand is decreasing.

Adjusting the valve to decrease the amount of exhaust to the turbine may include adjusting the valve to one of the second position and the third position, as described above with reference to FIGS. 3B and 3C, and 4B and 4C. As one example, the adjusting of the valve to decrease the amount of exhaust gas flow to the turbine may be further determined by engine speed at 518.

As such, at 518, the routine may confirm if an engine speed is greater than a second threshold engine speed. Similar to at 510, the second threshold engine speed may be a speed or range of speeds at which excess backpressure in the exhaust manifold may occur. In other words, the second threshold engine speed at 518 may be the same as the first pre-determined threshold speed at 510. In another embodiment, the routine may additionally or alternatively confirm if one or more other operating condition(s) are above one or more corresponding pre-determined threshold levels if these conditions were not confirmed at a preceding step. As an example, the routine may confirm if demanded torque and/or engine load are greater than corresponding pre-determined thresholds.

At 518, if the engine speed is less than the threshold engine speed, routine 500 may proceed to 522, wherein the valve, e.g., valve 140, may be adjusted to the second position, or a position substantially similar to the second position, as described above in reference to FIGS. 3B and 4B. The second position may include the valve being opened a metered amount to each of the first and second scrolls, and completely opened to the wastegate passage. As such, adjusting the valve to the second position may enable partial communication of exhaust between the first and second scrolls and full communication of exhaust from between the first and second scrolls and to the wastegate passage. In this way, adjusting the valve to the second position may maintain or reduce boost pressure during a low engine speed, a low engine load, and/or low or decreasing demanded torque.

Further, the metered amount of opening of valve 140 may be adjusted based on various engine operating conditions. For example, the metered amount of opening may decrease with increasing engine torque demands and/or engine loads. In another example, the metered amount of opening of valve 140 may increase as engine speed increases.

However, if it is confirmed at 518 that the engine speed (or other operating condition(s)) is greater than threshold engine speed, the routine may adjust the valve to the third position at 520, or a position substantially similar to the third position, as described above with reference to FIGS. 3C and 4C. As such, valve 140 may be opened completely to each of the first scroll 100 and second scroll 102, and opened a prescribed amount to wastegate passage 104 to decrease the amount of exhaust flow to the turbine. In other words, there may be full communication of exhaust between the first and second scrolls and partial communication of exhaust from between the first and second scrolls and to the wastegate passage. In this way, the aforementioned valve configuration may provide a desired boost pressure to meet a steady or decreasing demand for torque while reducing exhaust manifold backpressure during high engine speeds. The metered amount of opening of valve 140 may be adjusted based on various engine operating conditions. For example, the metered amount of opening may decrease with increasing engine torque demands and/or engine loads.

Thus, in some embodiments, routine 500 may allow substantially no exhaust gas to bypass the turbine (e.g., valve is adjusted to the first position, as described in FIGS. 3A and 4A, and/or fourth position, as shown in FIGS. 3D and 4D), and/or allow a portion of exhaust gas to bypass the turbine (e.g., valve is adjusted to the second position, as described in FIGS. 3B and 4B, and/or third position, as shown in FIGS. 3C and 4C). Thus, by adjusting a combination branch communication and wastegate valve, e.g., valve 140, an amount of fluidic communication among the first scroll 100, the second scroll 102, and the wastegate passage 104 may also be adjusted by controller 12 based on various engine operating conditions, such as engine load, engine speed, desired boost, and/or demanded torque. Consequently, an efficiency of the turbine (and turbocharger) and an amount of backpressure in the exhaust manifold may be controlled to achieve desired boost level(s) and engine torque. In other embodiments, adjusting the valve may provide the efficiency of the turbocharger and backpressure to be within predetermined range(s). The efficiency may be determined, for example, by monitoring the intake air pressure, which may be measured, for example, with pressure sensor 132. Other engine sensors and/or sensors not currently described herein, and/or sensors that may not be used in current engine designs may additionally or alternatively be used. For example, an exhaust gas pulse profile may be measured directly and/or determined by one or more sensor readings, or other measures and inferred or calculated by a controller, e.g., controller 12.

FIG. 6 includes graph 600 illustrating example adjustments to a position of a valve in response to engine operating conditions, including one of an engine load, engine speed, demanded boost pressure, and turbine speed. Specifically, graph 600 shows adjustments to valve position at plot 602, changes in engine load at plot 604, changes in engine speed at plot 606, changes in desired boost pressure at dotted plot 610, measured boost pressure at plot 608, changes in turbine speed at plot 612, and changes in amount of exhaust to turbine at plot 614. The valve discussed in FIG. 6 may be a combined branch communication and wastegate valve, as described above with reference to FIGS. 1-5. For example, the valve of FIG. 6 may be one of the valves depicted in FIGS. 3 and 4. Further, a position of the valve in this example may be one of the first position (denoted by "1"), second position (denoted by "2"), third position (denoted by "3"), and fourth position (denoted by "4"), as discussed above in reference to FIGS. 3A-4D. Time is plotted along the x-axis, and time increases from the left of the x-axis to the right. Further, a threshold engine load (e.g., T1) is represented by line 624, a threshold engine speed (e.g., T2) is shown by line 626, while a threshold turbine speed (e.g., T3) is represented at line 622.

Prior to time t1, the engine is off such that no combustion is occurring. At time t1, the engine is activated and may begin combusting. Between time t1 and time t2, the vehicle may be traveling along a road with a slight incline. Therefore, the engine load is gradually increasing, but remains below the threshold engine load T1 (e.g., line 624). Similarly, engine speed is steadily increasing, but still remains below the threshold engine speed T2 (e.g., line 626). In response to the aforementioned engine operating conditions, the valve may be adjusted to the second position (or a position substantially similar to the second position) at time t1 and maintained in the second position between time t1 and time t2. For example, in the second position, the valve may be opened a metered amount to each of the first and second scrolls of the turbine, and opened completely to the wastegate passage. Thus, a metered amount of exhaust gas from each of the scrolls enters the wastegate passage, thereby bypassing the turbine and reducing an amount of exhaust gas to the turbine as compared to a condition when the valve is completely closed to the wastegate passage. Since engine load is not above the threshold engine load between time t1 and time t2, the measured boost pressure (e.g., line 610) may reach the desired boost pressure (e.g., line 608) such that the measured and desired boost pressure are substantially the same. Further, turbine speed remains less than the threshold turbine speed T3 (e.g., line 622) because an amount of exhaust gas may bypass the turbine via the wastegate passage through the metered amount of opening.

At time t2, the vehicle may be traveling on a steeper incline road. As such, the engine load is increasing to meet and/or exceed the threshold engine load, T1, above which the vehicle operator may demand increased boost pressure at time t2. Further, the engine speed is increasing, but does not reach the threshold engine speed, T2, at time t2. Thus, the valve may be adjusted to the first position, or a position substantially similar to the first position, wherein the valve is closed to each of the first and second scrolls, and to the wastegate passage. In this way, between time t2 and time t3, substantially all exhaust gas from each of the first and second scrolls are directed to the turbine, and may not escape through the wastegate passage. Therefore, the desired boost pressure and measured boost pressure increase in response to increased engine load. In this particular example, the measured boost pressure may not meet the desired boost pressure between time t2 and time t3.

At time t3, the engine speed may reach and/or exceed the threshold engine speed, T2. As discussed above, the threshold engine speed may be a speed at or above which excessive engine exhaust backpressure may occur in a dual scroll turbocharger system. The vehicle may continue to hill climb between time t3 and time t4, and both engine speed and engine load are above their respective thresholds, T1 and T2. Concomitantly, turbine speed may also be increasing, but remain below the threshold turbine speed, T3. In response, the valve may be adjusted to the fourth position, or a position substantially similar to the fourth position, wherein the valve is opened to each of the first and second scrolls, and closed to the wastegate passage. Thus, as discussed above, substantially all exhaust gas from each of the first and second scrolls are directed to the turbine, and may not escape through the wastegate passage. Further, a space having a volume may form at an area adjacent to an interface of each of the first scroll, second scroll, and wastegate passage, such that an amount of exhaust gas may "blow down" into said space. In this way, there may be a reduction in backpressure and pumping work while increasing an amount of exhaust gas to the turbine to increase measured boost pressure to meet the desired boost pressure. Consequently, by time t4, the amount of exhaust gas flow to the turbine results in the measured boost pressure being substantially similar to the desired boost pressure.

At time t4, the vehicle may not be hill climbing, but instead, may be traveling on a road having little incline. In other examples, the vehicle may be moving downhill. In the aforementioned examples, the engine load may decrease below the threshold engine load. However, engine speed may still be above the threshold engine speed. Consequently, the desired boost pressure may decrease in response to declining engine load, and the valve may be adjusted to the third position, or a position substantially similar, at time t4. In the third position, the valve is opened completely to each of the first and second scrolls and opened a prescribed amount to the wastegate. As a result, an amount of exhaust gas may bypass the turbine, and enter the wastegate passage to a point downstream of the turbine. Similar to the fourth position, the third position may also provide a space having a volume formed at an area adjacent to an interface of each of the first and second scrolls, and the wastegate passage. Thus, when engine load, or demanded torque, is steady or decreasing as shown, and engine speed is greater than the threshold engine speed T2, the valve may be adjusted to the third position to reduce backpressure and pumping work. Further, the turbine speed steadily declines.

At time t5, the vehicle may continue moving downhill or on a road with little incline, and the engine speed decreases below the threshold engine speed, T2. Further, the engine load continues to steadily decrease, thereby reducing desired boost pressure between time t5 and time t6. In this example, the desired boost pressure and measured boost pressure is substantially the same between time t5 and time t6. Since engine load and boost pressure are not increasing, the valve may be adjusted to the second position to decrease an amount of exhaust flow to the turbine, wherein the valve is opened a metered amount to each of the first and second scrolls, and opened to the wastegate passage. In this way, an amount of exhaust gas in each of the first and second scrolls may be diverted away from the turbine to the point downstream of the turbine via the wastegate passage between time t5 and time t6. Since the amount of exhaust flow to the turbine is decreasing, the turbine speed is also decreasing between time t5 and time t6.

Between time t6 and t7, the vehicle may again begin to travel uphill, for example. In another example, the vehicle may be towing a trailer. As shown in this example, the engine load is increasing, but has not yet reached the threshold engine load between time t6 and t7. Although the threshold engine load has not been met by the measured engine load, the valve may be adjusted to the first position, or a position substantially similar to the first position, in order to drive an amount of exhaust flow to the turbine to meet an increase in demanded torque and boost pressure.

At time t7, the engine load reaches and/or exceeds the threshold engine load, T1, and the desired or demanded boost pressure is increased in response to the higher engine load. Further, the engine speed between time t6 and time t7 also increases, but has not yet reached the threshold engine speed, T2, at time t7. In response to the engine load exceeding the threshold engine load and the engine speed being less than the threshold engine speed, the valve may be adjusted to or remain in the first position, or a position substantially similar to the first position, to direct substantially all exhaust gas flow within the first and second scrolls to the turbine, thereby increasing turbine speed and measured boost pressure. Between time t7 and time t8, the desired boost pressure is greater than the measured boost pressure. However, the measured boost pressure is steadily increasing to meet the desired boost pressure at time t8.

At time t8, the engine speed is reaching and/or exceeding the threshold engine speed, T2, as engine load continues to remain above the threshold engine load. In response, the valve may be adjusted to the fourth position, or a position substantially similar to the fourth position, such that substantially all exhaust gas flow within the first and second scrolls are directed to the turbine to increase boost pressure and may not escape through the wastegate passage between times t8 and t9. Further, the aforementioned space having a volume may form at an area adjacent to an interface of each of the first scroll, second scroll, and wastegate passage, such that an amount of exhaust gas may "blow down" into said space. In this way, there may be a reduction in backpressure and pumping work while increasing an amount of exhaust gas to the turbine to increase measured boost pressure to meet the desired boost pressure. Consequently, the amount of exhaust gas flow to the turbine results in the measured boost pressure being substantially similar to the desired boost pressure. In addition, turbine speed continues to increase as exhaust flow is driving the turbine.

At time t9, the turbine speed is increasing to meet and/or exceed the threshold turbine speed. As mentioned above, the threshold turbine speed may be a speed at or above which mechanical damage on the turbine may occur, for example. In response to the turbine speed being greater than the threshold turbine speed, the valve may be adjusted to the third position in order to reduce the speed of the turbine despite engine load and/or engine speed being greater than their respective thresholds, T1 and T2. In the third position, the valve is opened completely to each of the first and second scrolls and opened a prescribed amount to the wastegate. As a result, an amount of exhaust gas may bypass the turbine, and enter the wastegate passage to the point downstream of the turbine between time t9 and time t10. As discussed above, the third position may also provide said space having a volume formed at an area adjacent to an interface of each of the first and second scrolls, and the wastegate passage. Thus, when turbine speed is above the threshold turbine speed, and engine speed is greater than the threshold engine speed T2, the valve may be adjusted to the third position to decrease turbine speed while simultaneously reducing backpressure and pumping work. However, between time t9 and time t10, the desired boost pressure is greater than the measured boost pressure due to the amount of exhaust gas escaping through the turbine.

Consequently, the speed of the turbine may decline between time t9 and time t10, resulting in the turbine speed being below the threshold turbine speed at time t10. In addition, at time t10, the vehicle may begin traveling on a road having little to no incline, such that engine load falls below the threshold engine load, T1, and desired boost pressure decreases. However, engine speed remains about the threshold engine speed. In response to each of the decreasing engine load, reduced desired boost pressure, and engine speed above the threshold engine speed, the valve may be remain, or be adjusted to, the third position. In the third position, the valve is opened completely to each of the first and second scrolls and opened a prescribed amount to the wastegate. Therefore, an amount of exhaust gas may bypass the turbine, and enter the wastegate passage to a point downstream of the turbine between time t10 and time t11. Moreover, backpressure and pumping work may also be reduced when the valve is in the third position and engine speed is greater than the threshold engine speed.

At time t11, the vehicle may continue moving downhill or on a road with little incline (e.g., a flat road), and the engine speed decreases below the threshold engine speed, T2. Further, the engine load continues to steadily decrease, thereby reducing desired boost pressure between time t11 and time t12. Since engine load, engine speed, and boost pressure are decreasing, the valve may be adjusted to the second position to reduce an amount of exhaust flow to the turbine, wherein the valve is opened a metered amount to each of the first and second scrolls, and opened to the wastegate passage. In this way, an amount of exhaust gas in each of the first and second scrolls may be diverted away from the turbine to the point downstream of the turbine via the wastegate passage. Since the amount of exhaust flow to the turbine is decreasing, the turbine speed is also decreasing. As shown in this example, the desired boost pressure and measured boost pressure is substantially the same between time t11 and time t12. At time t12, a vehicle cycle comprising all events between time t1 and time t12 ends.

The technical effect of adjusting a valve positioned in a passage connecting a first scroll, a second scroll, and a wastegate passage to control an amount of exhaust flow to the turbine is an effective and efficient control of boost pressure based on engine operating conditions, such as engine speed, engine load, and torque demand, while reducing backpressure and pumping work. Further, there may be a reduction in cost, weight, and packaging penalties associated with including a single combined branch communication valve and wastegate valve in the turbocharger and engine system, as compared to installing these components separately. There may also be less burden on an engine control and monitoring system when only a single valve is adjustable by the aforementioned system based on engine operating conditions.

Thus, in one embodiment, a method may be provided, comprising adjusting a valve positioned in a passage connecting a first scroll and a second scroll of a turbine to increase an amount of exhaust flow to the turbine when a turbine speed is less than a threshold and during a first load condition, and adjusting the valve to decrease the amount of exhaust flow to the turbine when turbine speed is greater than the threshold engine speed. Moreover, the valve may be in fluid communication with a wastegate passage flowing exhaust around the turbine.

In one example, the first load condition may include one or more of boost pressure being less than a desired boost pressure, engine load being greater than a threshold load, and torque demand increasing. In another example, adjusting the valve to increase the amount of exhaust flow to the turbine may include adjusting the valve to a first position and not communicating exhaust between the first and second scrolls and from the first and second scrolls to the wastegate passage, the first position including the valve being completely closed to each of the first scroll, second scroll, and the wastegate passage, when engine speed is less than a threshold engine speed. In yet another example, adjusting the valve to increase the amount of exhaust flow to the turbine may include adjusting the valve to a fourth position and communicating exhaust between the first and second scrolls but not from the first and second scrolls to the wastegate passage, the fourth position including the valve being completely opened to each of the first scroll and second scroll, and completely closed to the wastegate passage, when engine speed is greater than the threshold engine speed.

Further, in another embodiment, the method may also comprise adjusting the valve to decrease the amount of exhaust flow to the turbine when turbine speed may be less than the threshold and during a second load condition, the second load condition including one or more of boost pressure being greater than the desired boost pressure, engine load being less than the threshold load, and decreasing torque demand.

In one example, adjusting the valve to decrease the amount of exhaust flow to the turbine may include adjusting the valve to a second position and partially communicating exhaust between the first and second scrolls and fully communicating exhaust from between the first and second scrolls and to the wastegate passage, the second position including the valve being opened a metered amount to each of the first and second scrolls, and completely opened to the wastegate passage, when the engine speed is less than the threshold engine speed. In addition, the method may increase the metered amount of opening to each of the first and second scroll as engine speed increases.

In another example, adjusting the valve to decrease the amount of exhaust flow to the turbine may include adjusting the valve to a third position and fully communicating exhaust between the first and second scrolls and partially communicating exhaust from between the first and second scrolls and to the exhaust passage, the third position including the valve being completely opened to each of the first and second scroll, and opened a metered amount to the wastegate passage when the engine speed is greater than the threshold engine speed. Further, the method may include increasing the metered amount of opening to the wastegate passage as engine speed decreases.

In some embodiments, the valve may be a cylindrical valve that rotates on a first axis perpendicular to a direction of exhaust flow through each of the first scroll and the second scroll. In other embodiments, the valve may be a spool valve having a movable element configured to move along a second axis to provide selective fluidic communication between each of the first scroll, the second scroll, and the wastegate passage.

In addition, in one embodiment, an engine system may be provided comprising a first passage for fluid conveyance from a first set of combustion chambers to a turbine, a second passage for fluid conveyance from a second set of combustion chambers to the turbine, and separated from the first passage by a dividing wall, a third passage for fluid conveyance from the first passage and the second passage to a location downstream from the turbine, a valve positioned in the dividing wall for selectively allowing fluid from one of the first and second passages to another of the first and second passages and for selectively allowing fluid from one or both of the first and second passages to the location downstream from the turbine.

In one example, the valve may be integrated into one of a cylinder head, an exhaust manifold, and a turbocharger of an engine configured to use a turbocharger system. In another example, the valve may be a cylindrical valve that rotates on a first axis perpendicular to a direction of exhaust flow through each of the first scroll and the second passage. In alternate examples, the valve may be a spool valve having a movable element configured to move along a second axis to provide selective fluid conveyance between one or more combinations of the first passage, the second passage, and the third passage.

In yet another embodiment, the valve may be positionable via a signal received from a controller in a continuous manner through selected ranges. As such, the valve may be closed to each of the first and second scrolls, and closed to the point downstream from the turbine when boost pressure is less than a threshold pressure and engine speed is less than a threshold engine speed. In another example, the valve may be opened a metered amount to each of the first and second scrolls, and opened to the point downstream from the turbine when boost pressure is greater than the threshold pressure and engine speed is less than the threshold engine speed. In yet another example, the valve may be opened completely to each of the first and second scrolls, and opened a prescribed amount to the point downstream from the turbine when boost pressure is greater than the threshold pressure and engine speed is greater than the threshold engine speed. In an alternative example, the valve may be opened completely to each of the first and second scrolls, and closed to the point downstream from the turbine when boost pressure is less than the threshold pressure and engine speed is greater than the threshold engine speed.

In another representation, a method for an engine is provided, comprising allowing at least a portion of an exhaust gas to pass from a first turbine inlet scroll to a second turbine inlet scroll and to a turbine via one or more moveable obstructions during a first condition; and allowing at least a portion of the exhaust gas to exit the first and/or second turbine inlet scroll and to bypass the turbine to an exhaust path via the one or more movable obstructions during a second condition. Furthermore, during the first condition, the method includes adjusting the one or more movable obstructions to be closed to each of the first and second turbine inlet scrolls and closed to a wastegate passage when engine speed is below a threshold. Alternatively, the method includes adjusting the one or more movable obstructions to be opened completely to each of the first and second turbine inlet scrolls and closed to a wastegate passage when engine speed is above the threshold. In another example of the aforementioned representation, the second condition may include adjusting the one or more movable obstructions to be opened a metered amount to each of the first and second turbine inlet scrolls and opened completely to the wastegate passage when engine speed is below the threshold. On the other hand, when engine speed is above the threshold, the method may include adjusting the one or more movable obstructions to be closed to each of the first and second turbine inlet scrolls and opened a prescribed amount to the wastegate passage when engine speed is above the threshold speed.

Further, in the representation, one or more movable obstructions may be one of a cylindrical valve and a spool valve. The one or more movable obstructions may be integrated into a cylinder head, turbocharger, or an exhaust manifold of an engine configured to use the turbocharger system.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method, comprising:
adjusting a valve positioned in a passage connecting a first scroll and a second scroll of a turbine and connected to a wastegate passage flowing exhaust around the turbine into a first position to increase an amount of exhaust flow to the turbine when a turbine speed is less than a threshold and during a first load condition of the engine, the first position including the valve being completely closed to each of the first scroll, the second scroll, and the wastegate passage;
adjusting the valve into a second position to decrease the amount of exhaust flow to the turbine when engine speed is less than a threshold engine speed and during a second load condition of the engine, the second position including the valve being partially opened to each of the first and second scrolls, and completely opened to the wastegate passage; and
adjusting the valve from the first position to a third position, without passing through the second position, when engine speed is greater than the threshold engine speed and during a third load condition of the engine, the third position including the valve being completely opened to each of the first scroll and the second scroll, and completely closed to the wastegate passage.

2. The method of claim 1, wherein the valve positioned within a dividing wall separating the first scroll and the second scroll.

3. The method of claim 1, wherein the first load condition includes one or more of boost pressure being less than a desired boost pressure, engine load being more than a threshold load, and increasing torque demand.

4. The method of claim 3, wherein the second load condition includes one or more of boost pressure being greater than the desired boost pressure, engine load being less than the threshold load, and decreasing torque demand, and wherein the third load condition includes engine load being greater than the threshold load.

5. The method of claim 1, wherein adjusting the valve into the first position includes not communicating exhaust between the first and second scrolls and from the first and second scrolls to the wastegate passage, and wherein adjusting the valve from the first position to the third position includes increasing communication of exhaust between the first scroll and second scroll and not communicating exhaust from the first and second scrolls to the wastegate passage.

6. The method of claim 1, wherein adjusting the valve into the second position includes partially communicating exhaust between the first and second scrolls and fully communicating exhaust from between the first and second scrolls and to the wastegate passage, and only a portion of exhaust gas less than an amount of exhaust gas flowing between the first and second scrolls when the valve is in the third position is flowed between the first and second scrolls.

7. The method of claim 6, further comprising increasing exhaust gas flow to each of the first and second scrolls as engine speed increases.

8. The method of claim 1, further comprising adjusting the valve to a fourth position and fully communicating exhaust between the first and second scrolls and partially communicating exhaust from between the first and second scrolls and to the wastegate passage, the fourth position including the valve being completely opened to each of the first and second scrolls, and partially opened to the wastegate passage, when engine speed is greater than the threshold engine speed and during one or more of the first load condition and turbine speed greater than the threshold.

9. The method of claim 8, further comprising increasing exhaust gas flow to the wastegate passage as engine speed decreases.

10. The method of claim 1, wherein the valve is a cylindrical valve that rotates on a first axis perpendicular to a direction of exhaust flow through each of the first scroll and the second scroll, and wherein the cylindrical valve is positioned in an area adjacent to and shares an interface with the first scroll and the second scroll.

11. The method of claim 10, wherein adjusting the valve from the first position to the third position, without passing through the second position, includes rotating the valve in a clockwise direction.

12. A dual scroll turbocharger system, comprising:
a first scroll;
a second scroll, fluidically separated from the first scroll via a dividing wall arranged between the first scroll and the second scroll;
a passage positioned within the dividing wall, fluidically bridging the first scroll and the second scroll, and in fluidic communication with a point downstream from a turbine;
a valve positioned within the passage and movable between selected positions; and
a controller programmed to adjust the valve between selected positions, including:
  a first position wherein the valve is closed to each of the first and second scrolls, and closed to the point downstream from the turbine;
  a second position wherein the valve is partially opened to each of the first and second scrolls, and completely opened to the point downstream from the turbine; and
  a third position wherein the valve is opened completely to each of the first and second scrolls, and closed to the point downstream from the turbine, and when the valve is moved between the first and third positions, the valve is maintained closed to the point downstream from the turbine without passing through the second position and opening communication between the point downstream from the turbine and each of the first scroll and the second scroll.

13. The dual scroll turbocharger system of claim 12, wherein the valve is rotatable about an axis that is arranged perpendicular to flow through the first scroll and the second scroll, through the selected positions, the selected positions further including:
  a fourth position wherein the valve is opened completely to each of the first and second scrolls, and partially opened to the point downstream from the turbine.

14. The dual scroll turbocharger system of claim 12, wherein the valve is integrated into one of a cylinder head, a turbocharger, and an exhaust manifold of an engine configured to use the turbocharger system, wherein the valve includes a valve body, and wherein the valve includes one or more external surfaces disposed to allow heat to be removed from the valve body.

15. An engine system comprising:
  a first passage for fluid conveyance from a first set of combustion chambers to a turbine;
  a second passage for fluid conveyance from a second set of combustion chambers to the turbine, and separated from the first passage by a dividing wall;
  a third passage for fluid conveyance from the first passage and the second passage to a location downstream from the turbine;
  a valve positioned in the dividing wall; and
  a controller programmed to adjust the valve between selected positions, including:
    a first position wherein the valve is closed to each of the first and second passages, and closed to the location downstream from the turbine when boost pressure is less than a desired pressure and engine speed is less than a threshold engine speed;
    a second position wherein the valve is opened partially to each of the first and second passages, and completely opened to the location downstream from the turbine when boost pressure is greater than the desired pressure and engine speed is less than the threshold engine speed;
    a third position wherein the valve is opened completely to each of the first and second passages, and partially opened to the location downstream from the turbine when boost pressure is greater than the desired pressure and engine speed is greater than the threshold engine speed; and
    a fourth position wherein the valve is opened completely to each of the first and second passages, and closed to the location downstream from the turbine when boost pressure is less than the desired pressure and engine speed is greater than the threshold engine speed.

16. The engine system of claim 15, wherein the valve is integrated into one of a cylinder head, an exhaust manifold, and a turbocharger of an engine configured to use a turbocharger system.

17. The engine system of claim 16, wherein the valve is a cylindrical valve that rotates on a first axis perpendicular to a direction of exhaust flow through each of the first passage and the second passage.

18. The engine system of claim 17, wherein the valve is rotatable about the first axis and wherein the controller is further configured to rotate the valve in a clockwise direction from the first position to the fourth position without passing through the second and third positions.

* * * * *